United States Patent Office 3,065,262
Patented Nov. 20, 1962

3,065,262
ALKYL ARYL SULFONATES
Roy C. Sias, Ponca City, Okla., assignor to Continental Oil Company, Ponca City, Okla., a corporation of Delaware
No Drawing. Filed Sept. 22, 1958, Ser. No. 762,260
4 Claims. (Cl. 260—505)

The present invention relates to the production of oil-soluble alkyl aryl sulfonates and relates more particularly to the production of oil-soluble alkyl aryl sulfonates which are of a light color.

Sulfonation of alkyl aryl hydrocarbons has generally followed the procedure wherein about 1.3 to 2 parts by weight of 100 to 105 percent sulfuric acid is used per part by weight of the alkyl aryl hydrocarbon. Other sulfonating agents have been used including oleum and sulfur trioxide; but whatever agent used, the resulting mixture upon completion of the sulfonation reaction followed by neutralization has many times produced an off-colored sulfonate. Obviously, as a general rule, the lighter the color of the final product, the more acceptable the product is commercially. Methods as used heretofore for bleaching have involved such procedures as separating the desired sulfonated hydrocarbon from the undesirable materials which consists of sulfuric acid, unreacted hydrocarbons, carbonaceous materials, and other miscellaneous materials. Typical methods used to effect this separation include the addition of water or a hydrocarbon solvent followed by settling to stratify the materials, after which the desired product is drawn off. It is obvious that such procedures are costly and time consuming; furthermore, they are generally inefficient, as the color improvement resulting from such a process is low.

When sulfuric acid or oleum is used as the sulfonating agent, the sulfonic acid mixture will contain varying amounts of sulfuric acid. Recently, sulfur trioxide has been used as the sulfonating agent. The use of sulfur trioxide as the sulfonating agent has a number of advantages as compared to sulfuric acid or oleum. One of these is that a process employing sulfur trioxide can be operated as a continuous process; and, in addition, contamination with sulfuric acid of the final product is eliminated. One serious disadvantage in the use of sulfur trioxide, however, is that the sulfonic acid and final sulfonate produced is generally of a darker color than the sulfonic acid and final sulfonate produced employing sulfuric acid or oleum as the specific sulfonating agent.

It is, therefore, a principal object of this invention to provide an improved process, which process obviates the disadvantages of the prior art methods. It is another object of my invention to provide an improved method of treating neutralized alkyl aryl sulfonic acids whereby a light-colored sulfonate may be obtained. Further objects and advantages of the invention will become apparent as the description proceeds.

The foregoing objects and advantages are obtained by a process wherein the neutralized sulfonate is heated to a temperature within the range of 75 to 160° C. for a period of time which may vary from about 1 to 168 hours. Generally, I prefer to heat the neutralized sulfonate to a temperature range from about 85 to 150° C. for a period of time varying from about 4 to 100 hours.

Before describing the invention in more detail, it may be well to give a description of the preferred sulfonation procedure used and the test method used for determining color. It should be understood, however, that this description is given by way of illustration only; and the present invention is operable regardless of the specific sulfonation process employing sulfur trioxide as the sulfonating agent.

The reaction vessel used was a modified version of a Votator, which is commercially available and is generally described in United States Patents Nos. 2,063,065 and 2,063,066, issued December 8, 1936. Briefly, the procedure is as follows: the sulfur trioxide used is first diluted with air in a ratio of air to sulfur trioxide which varies from 30:1 to 1:1. The sulfonatable material is introduced into one end of the Votator and in passing therethrough forms a film on the refrigerated surface of the Votator. When first contacted with sulfur trioxide, this film is only partially sulfonated and is removed in that condition by the progressively moving scrapers. The partially sulfonated material is then reapplied to the refrigerated surface further along in the Votator as a film and contacted with an additional quantity of sulfur trioxide. The steps of removing the film, reapplying to the surface, and contacting with additional sulfur trioxide are repeated until the completely sulfonatable materials are removed from the other end of the Votator. The total residence time of the sulfonatable material in the Votator may vary from a fraction of a second to two minutes, while the temperature employed may vary from 50 to about 200° F.

A more detailed account of this sulfonation procedure may be found in United States Patent No. 2,768,199, issued to Horace E. Luntz and Daniel O. Popovac.

Suitable oil-soluble alkyl aryl hydrocarbons which may be used are those obtained by the reaction of excess benzene, toluene, xylene, naphthalene, or similar hydrocarbons with an alkylating agent in the presence of a Friedel-Crafts type catalyst such as boron fluoride, hydrogen fluoride, sulfuric acid, etc. The alkylation may be made under the influence of a catalyst with alkylating agents having a carbon atom content which provides that the resulting alkyl aryl hydrocarbon is oil-soluble. Other preferred sulfonic acids are those obtained by the sulfonation of a hydrocarbon prepared by the alkylation of benzene or toluene with one or more equivalents of halogenated petroleum wax having from about 18 to more than 30 carbon atoms. A preferred sulfonic acid for use in the process of my invention is the sulfonic acid produced by sulfonating the product known as postdodecylbenzene. For the sake of simplicity, this material is often referred to as PDB and will be so used in this disclosure.

Postdodecylbenzene consists of monoalkylbenzenes and dialkylbenzenes in the approximate mole ratio of 2 to 3. Its typical physical properties are as follows:

Specific gravity at 38° C _____ 0.8649
Average molecular weight _____ 385
Percent sulfonatable _____ 88
A.S.T.M., D-158 Engler:
   I.B.P. _____° F__ 647
   5 _____° F__ 682
   50 _____° F__ 715
   90 _____° F__ 760
   95 _____° F__ 775
   F.B.P. _____° F__ 779
Refractive index at 23° C _____ 1.4900
Viscosity at:
   −10° C. _____centipoises__ 2800
   20° C. _____do____ 280
   40° C. _____do____ 78
   80° C. _____do____ 18
Aniline point _____° C__ 69
Pour point _____° C__ 25

The colors of the sulfonates were determined by the Lovibond test method. In this method a 7 percent (by weight) solution of the sulfonate (on a 100 weight percent active basis) is prepared in white oil. The sulfonate solution is then poured into a cuvette (19 x 105 mm. round) and the optical density determined at 530 millimicrons wave length in a Coleman spectrophotometer, using distilled water as the standard. Optical densities below 0.600 are read to the nearest 0.005 and above 0.600 are read to the nearest 0.01. Lovibond colors are then calculated by multiplying the optical density by 11.3 and rounding off the results to the nearest tenth.

In order to disclose the nature of the present invention still more clearly, the following illustrative examples will be given. It is to be understood that the invention is not to be limited to the specific conditions or details set forth in these examples except in so far as such limitations are specified in the appended claims.

EXAMPLE I

PDB was sulfonated as described above wherein the sulfonation conditions employed were as follows:

| | |
|---|---|
| Temperature, ° F | 150 |
| Back pressure, lbs./sq. in | 14 |
| Air-$SO_3$ volume ratio | 19:1 |
| $SO_3$, percent of theoretical | 130 |

The crude sulfonic acid was diluted with 3 volumes of naphtha for acid sludge removal, contacted with 2 percent (by weight) of Attapulgus clay, blown with nitrogen for one hour at ambient temperature to remove $SO_2$, and then filtered through Hyflo. The purified sulfonic acid was then neutralized with aqueous sodium hydroxide. The solvents were removed by distillation, and the activity of the product was adjusted to 62 percent by the addition of 170 Pale Oil (which is a paraffinic mineral oil having an SSU viscosity at 100° F. of 170). The product had a Lovibond color of 9.7.

Samples of this sulfonate were placed in a constant temperature oven maintained at 85±1° C. for 48 hours and 120 hours, respectively. Lovibond colors on these heat-treated products is shown in Table I.

EXAMPLE II

A sodium sulfonate was prepared using the procedure described in Example I, with the following exceptions: a different sample of PDB was used and methanolic sodium hydroxide was used. The product had a Lovibond color of 5.7.

A sample of this sulfonate was placed in a constant temperature oven maintained at 82±1° C. for 48 hours. The Lovibond color on this heat-treated product was 3.6 and is shown in Table I also.

EXAMPLE III

A sodium PDB sulfonate was prepared from a sulfur trioxide sulfonated PDB, prepared in the manner previously described. The conditions of sulfonation were as follows:

| | |
|---|---|
| Temperature, ° F | 150 |
| Back pressure, lbs./sq. in | 14 |
| Air-$SO_3$ volume ratio | 19:1 |
| $SO_3$, percent of theoretical | 130 |

The crude sulfonic acid was diluted with white oil for acid sludge removal, contacted with 1 percent (by weight) of Attapulgus clay, blown with nitrogen for one hour at ambient temperature to remove $SO_2$, and then filtered through Hyflo. The sulfonic acid was extracted from the acid-oil with methanol, after which the methanolic solution of sulfonic acid was neutralized with aqueous sodium hydroxide. The solvents were removed by distillation, and the activity of the product was adjusted to 62 percent by the addition of 170 Pale Oil. The product had a Lovibond color of 4.7.

A sample of this sulfonate was placed in a constant temperature oven maintained at 82±1° C. for 48 hours. The Lovibond color on this heat-treated product was 3.5 and is shown in Table I also.

EXAMPLE IV

The sample of Example I which had been heated at 85±1° for 48 hours (product B, Table I) was mixed with 10 percent (by weight) of water and dehydrated by heating to 140° C. The Lovibond color was again found to be 7.1 and is shown in Table I also.

EXAMPLE V

A sodium PDB sulfonate was prepared from a sulfur trioxide sulfonated PDB, prepared in the manner previously described. The conditions of sulfonation were as follows:

| | |
|---|---|
| Temperature, ° F | 110 |
| Back pressure, lbs./sq. in | 11 |
| Air-$SO_3$ volume ratio | 10:1 |
| $SO_3$, percent of theoretical | 150 |

The crude sulfonic acid was diluted with white oil and allowed to settle for two hours. The acid-oil was decanted from the sludge and treated with 1 percent (by weight) of Attapulgus clay with simultaneous degassing by nitrogen blowing for one hour at ambient temperature. The purified acid-oil was filtered through Hyflo and then extracted with methanol. The methanolic solution of PDB sulfonic acid was then neutralized with aqueous sodium hydroxide. The solvents were removed by heating to a pot temperature of 140° C., whereupon the activity of the product was adjusted to 63.4 percent by the addition of white oil. This product had a Lovibond color of 3.9.

Two procedures were used for heat-treating samples of this example. In most cases, about 100 grams of sample was placed in a test tube which was immersed in a constant temperature bath. Duplicate samples were used, with stirring being applied to one of the samples. At timed intervals, portions of the samples were removed and the Lovibond color determined. The following temperatures were used: 83° C., 120° C., 134° C., and 150° C.

The other procedure consisted of placing 100 grams of sample in a test tube, which was then placed in a constant temperature oven. This procedure was employed only at 85° C.

The data for the samples of this example are shown in Table II.

*Table I*

HEAT BLEACHING OF SODIUM PDB SULFONATES
SUMMARY OF DATA ON SAMPLES OF EXAMPLES I–IV

| Sample | Temperature, ° C. | Hours | Lovibond color |
|---|---|---|---|
| A. Example I | | 0 | 9.7 |
| B. Example I | 85±1 | 48 | 7.1 |
| C. Example I | 85±1 | 120 | 5.6 |
| D. Example II | | 0 | 5.7 |
| E. Example II | 82±1 | 48 | 3.6 |
| F. Example III | | 0 | 4.7 |
| G. Example III | 82±1 | 48 | 3.5 |
| H. Example IV | 82±1 | 48 | 7.1 |

Table II

HEAT BLEACHING OF SODIUM PDB SULFONATES SUMMARY OF DATA ON SAMPLES OF EXAMPLE V

| Sample | Stirring | Temperature, °C | Hours | Color Lovibond |
|---|---|---|---|---|
| Untreated product | | | 0 | 3.9 |
| 1-A | No | 83±1 | 6 | 3.5 |
| 1-B | No | 83±1 | 24 | 3.3 |
| 1-C | No | 83±1 | 48 | 3.3 |
| 1-D | No | 83±1 | 144 | 3.1 |
| 1-E | No | 83±1 | 168 | 3.2 |
| 1-F | Yes | 83±1 | 6 | 3.7 |
| 1-G | Yes | 83±1 | 72 | 3.5 |
| 1-H | Yes | 83±1 | 144 | 3.4 |
| 1-I | Yes | 83±1 | 168 | 3.5 |
| 2-A [1] | | 85 | 24 | 3.2 |
| 2-B [1] | | 85 | 48 | 3.2 |
| 2-C [1] | | 85 | 72 | 3.1 |
| 2-D [1] | | 85 | 168 | 2.8 |
| 3-A | No | 120±2 | 2 | 3.9 |
| 3-B | No | 120±2 | 29 | 3.7 |
| 3-C | No | 120±2 | 72 | 3.6 |
| 3-D | No | 120±2 | 98 | 3.4 |
| 3-E | No | 120±2 | 168 | 3.4 |
| 3-F | Yes | 120±2 | 2 | 3.8 |
| 3-G | Yes | 120±2 | 10 | 3.6 |
| 3-H | Yes | 120±2 | 29 | 3.8 |
| 3-I | Yes | 120±2 | 72 | 3.4 |
| 3-J | Yes | 120±2 | 98 | 3.1 |
| 3-K | Yes | 120±2 | 168 | 4.0 |
| 4-A | No | 134±2 | 4 | 2.9 |
| 4-B | No | 134±2 | 20 | 2.8 |
| 4-C | No | 134±2 | 43 | 2.4 |
| 4-D | No | 134±2 | 69 | 2.4 |
| 4-E | No | 134±2 | 93 | 1.9 |
| 4-F | No | 134±2 | 168 | 2.2 |
| 4-G | Yes | 134±2 | 4 | 2.7 |
| 4-H | Yes | 134±2 | 20 | 2.5 |
| 4-I | Yes | 134±2 | 43 | 1.9 |
| 4-J | Yes | 134±2 | 52 | 1.9 |
| 4-K | Yes | 134±2 | 69 | 2.3 |
| 4-L | Yes | 134±2 | 93 | 3.7 |
| 4-M | Yes | 134±2 | 168 | 23.2 |
| 5-A | No | 150±3 | 4 | 2.7 |
| 5-B | No | 150±3 | 24 | 2.5 |
| 5-C | No | 150±3 | 48 | 2.3 |
| 5-D | No | 150±3 | 56 | 2.0 |
| 5-E | No | 150±3 | 72 | 1.5 |
| 5-F | No | 150±3 | 96 | 1.9 |
| 5-G | Yes | 150±3 | 4 | 2.6 |
| 5-H | Yes | 150±3 | 24 | 2.2 |
| 5-I | Yes | 150±3 | 48 | 1.5 |
| 5-J | Yes | 150±3 | 56 | 1.7 |
| 5-K | Yes | 150±3 | 72 | 2.5 |
| 5-L | Yes | 150±3 | 96 | 4.0 |

[1] These samples were heated in a constant temperature oven.

The data presented in Tables I and II clearly indicate that heating the sulfonate product under selected conditions of temperature and time improves the color of the product. The data further indicate that temperatures in the range of 130–155° C. are more effective but that the time interval is more critical at these temperatures. Example IV shows that the color improvement obtained is not affected by heating with water. It is also shown that stirring is desirable under certain conditions.

The invention having thus been described, what is claimed and desired to be secured by Letters Patent is:

1. A process for preparing light-colored oil-soluble alkali metal alkyl aryl sulfonates, said process comprising:
   (a) sulfonating an alkyl aryl hydrocarbon, said hydrocarbon being oil-soluble on sulfonation and neutralization with an alkali metal, and containing an aryl radical selected from the group consisting of benzene, toluene, xylene and naphthalene, with sulfur trioxide to produce an oil-soluble alkyl aryl sulfonic acid,
   (b) neutralizing said oil-soluble alkyl aryl sulfonic acid in the presence of a solvent by adding thereto an alkali metal basic compound dissolved in a second solvent selected from the group consisting of water and methanol,
   (c) removing the solvents from the resulting oil-soluble alkali metal alkyl aryl sulfonate, and
   (d) heating said sulfonate at a temperature in the range of about 75° to about 160° C. for a period of time until optimum decolorization occurs.

2. The process of claim 1 wherein said alkali metal is sodium.

3. The process of claim 1 wherein the temperature for heating in step d is 85° to 150° C.

4. The process of claim 1 wherein the period for heating in step d is from 4 to 100 hours.

References Cited in the file of this patent

UNITED STATES PATENTS 2,832,801 Bernstein _____ Apr. 29, 1958
2,847,459 Mitchell _____ Aug. 12, 1958